United States Patent [19]

Walters et al.

[11] 3,722,305

[45] Mar. 27, 1973

[54] VARIABLE SPEED PULSE DRIVE

[76] Inventors: Ronald G. Walters, 6556 Maplewood Rd., Mayfield Heights, Ohio 44124; Thomas M. Zwitter, 9906 Fairmont Rd., Newbury, Ohio 44065

[22] Filed: May 12, 1971

[21] Appl. No.: 142,473

[52] U.S. Cl. .................................. 74/125.5, 74/63
[51] Int. Cl. ............................................ F16d 27/10
[58] Field of Search ............... 74/63, 125.5, 142, 156

[56] References Cited

UNITED STATES PATENTS

| 1,803,458 | 5/1931 | Berry | 74/63 |
|---|---|---|---|
| 1,870,875 | 8/1932 | Scheuer | 74/63 |
| 1,872,636 | 8/1932 | Greening et al. | 74/63 |

FOREIGN PATENTS OR APPLICATIONS

| 787,364 | 12/1957 | Great Britain | 74/63 |

Primary Examiner—Charles J. Myhre
Assistant Examiner—Wesley S. Ratliff, Jr.
Attorney—Fay, Sharpe and Mulholland

[57] ABSTRACT

A drive or transmission mechanism including a rotary cam means having a plurality of lobes and adapted to be rotated about a first axis. Engaged by the cam means are a plurality of cam followers biased toward the first axis and constrained against all movement except reciprocal movement generally radially of the axis. Each of the cam followers engages a separate lever means drivingly connected to separate overrunning clutches such that during rotation of the cam, oscillation of the lever means will cause the overrunning clutches to be given intermittant unidirectional movement. The clutches are drivingly connected to a rotary output member which, for example, can be a ring gear or the like. Means are also shown for allowing the lever to shift relative to the cam followers upon variation in the load on the output member. In the embodiment shown they include a mounting for the overrunning clutches which permits them to shift circumferentially relative to the cam followers to vary the effective length of the lever means. Springs acting against the support for the overrunning clutches permit the necessary shifting as the load on the rotary output member varies.

13 Claims, 4 Drawing Figures

INVENTORS
THOMAS M. ZWITTER
RONALD G. WALTERS
BY Fay, Sharpe & Mulholland
ATTORNEYS INVENTORS
THOMAS M. ZWITTER
RONALD G. WALTERS
BY
Fay, Sharpe & Mulholland
ATTORNEYS

VARIABLE SPEED PULSE DRIVE

The present invention is directed to the art of drive mechanisms and, more particularly, to an improved variable speed pulse drive.

The invention is particularly suited for use as the drive mechanism for a marine winch and will be described with particular reference thereto; however, as will become apparent, the invention is capable of much broader application and could be used as a drive or power transmission for many types of devices.

Prior to the subject invention, the typical marine winch comprised a drum which was rotated through a manual crank connected to the drum through a reduction gear train. Under low loads, the operator could rotate the drum at a relatively high rate of speed and take in a substantial amount of line. As the load on the line increased however, manual turning of the crank became extremely difficult. The gear train had to be selected so that under high loads, the operator could still manually operate it. As a consequence, under lower loads, the rate of line takeup was limited by the speed with which the operator could rotate the crank. No matter how small the load, there was a definite limit on the speed with which the crank could be manually rotated.

Attempts were made to overcome the above problems by providing two-speed gear change drives so that under low loads, none or very little gear reduction took place. Under higher loads, the gearing could be shifted to increase the amount of reduction and, accordingly, the mechanical advantage of the drive. Although this approach provided certain advantages, it had drawbacks in that the operator was required to stop and manually change the gear ratio before the winding in of the line could continue. Moreover, the system was still a compromise in that any one gear ratio was most satisfactory under only one load. Assuming the operator's strength remains constant, the maximum rate at which he can take in the line will depend upon the particular gear ratio employed.

It has been proposed that a constantly variable drive should be employed so that the most ideal relationship between load and drum speed is achieved. That is, the operator could rotate the manual crank with a substantially constant torque input with the drive continually changing to most suitably meet the line load and take in the line at the maximum velocity. Prior to the subject invention, a satisfactory, constantly variable drive suitable for this type of use has not been available.

The subject invention provides a variable speed pulse drive mechanism which allows the above desirable consequences to be achieved. In particular, the proposed apparatus contemplates a drive or transmission mechanism including a rotary cam means having a plurality of lobes and adapted to be rotated about a first axis. Engaged by the cam means are a plurality of cam followers biased toward the first axis and constrained against all movement except reciprocal movement generally radially of the axis. Each of the cam followers engages a separate lever means drivingly connected to separate overrunning clutches such that during rotation of the cam, oscillation of the lever means will cause the overrunning clutches to be given intermittant unidirectional movement. The clutches are drivingly connected to a rotary output member which, for example, can be a ring gear or the like. Preferably, means are provided to allow the lever to shift relative to the cam followers upon variation in the load on the output member. These means could be many types but, in the subject embodiment, they include a mounting for the overrunning clutches which permits them to shift circumferentially relative to the cam followers to vary the effective length of the lever means. For example, a spring or springs acting against the support for the overrunning clutches can permit the necessary shifting as the load on the rotary output member varies. The spring force is, of course, selected for a particular load range.

Preferably, and in accordance with another aspect of the invention, the invention contemplates that there can be a substantial number of cam followers, each offset slightly relative to the cam so that during cam rotation, at least one follower is always moving radially outward and imparting a drive force to the output member. By proper design of the cam contour, the location of the followers, and the number of the followers, extremely smooth output movements can be provided. Note that the impulses imparted by the followers are overlapping. When applied to the output member through the overrunning clutches, there is sufficient overlap to provide integration of random backlash.

In accordance with another aspect, the invention contemplates that the cam followers can be positioned in diametrically opposed pairs about the circumference of the cam means and located relative to the cam contour so that during cam rotation, the forces exerted against the cam are always radially counterbalanced. That is, for example, the cam contour can be such that the opposed followers are always moving radially outward at the same time. It should be understood, however, that other pairs of followers would be slightly out of phase with the first mentioned pair so that the resulting output movement of the device is relatively smooth and pulse-free.

The device permits a wide range of effective gear ratios or mechanical advantages. Further, the mechanism is such that efficiency is inherently higher under higher torque output loads.

Accordingly, a primary object of the invention is the provision of a variable speed drive in which a variable torque output can be achieved with a constant speed and torque input.

Another object is the provision of a drive of the type described wherein a high degree of cam follower movement overlap can be provided to assure a smooth output movement.

Another object is the provision of a drive mechanism of the general type described wherein rotary input movement is changed to linear movement and then to a rotary output movement.

A still further object is the provision of a drive mechanism in which overrunning clutches are used to drive a rotary output member in a manner which permits taking full advantage of overlapping impulse movements for integration of random backlash movements.

The above and other objects and advantages will become apparent from the following description when read in conjunction with the accompanying drawings wherein.

Figure 1:
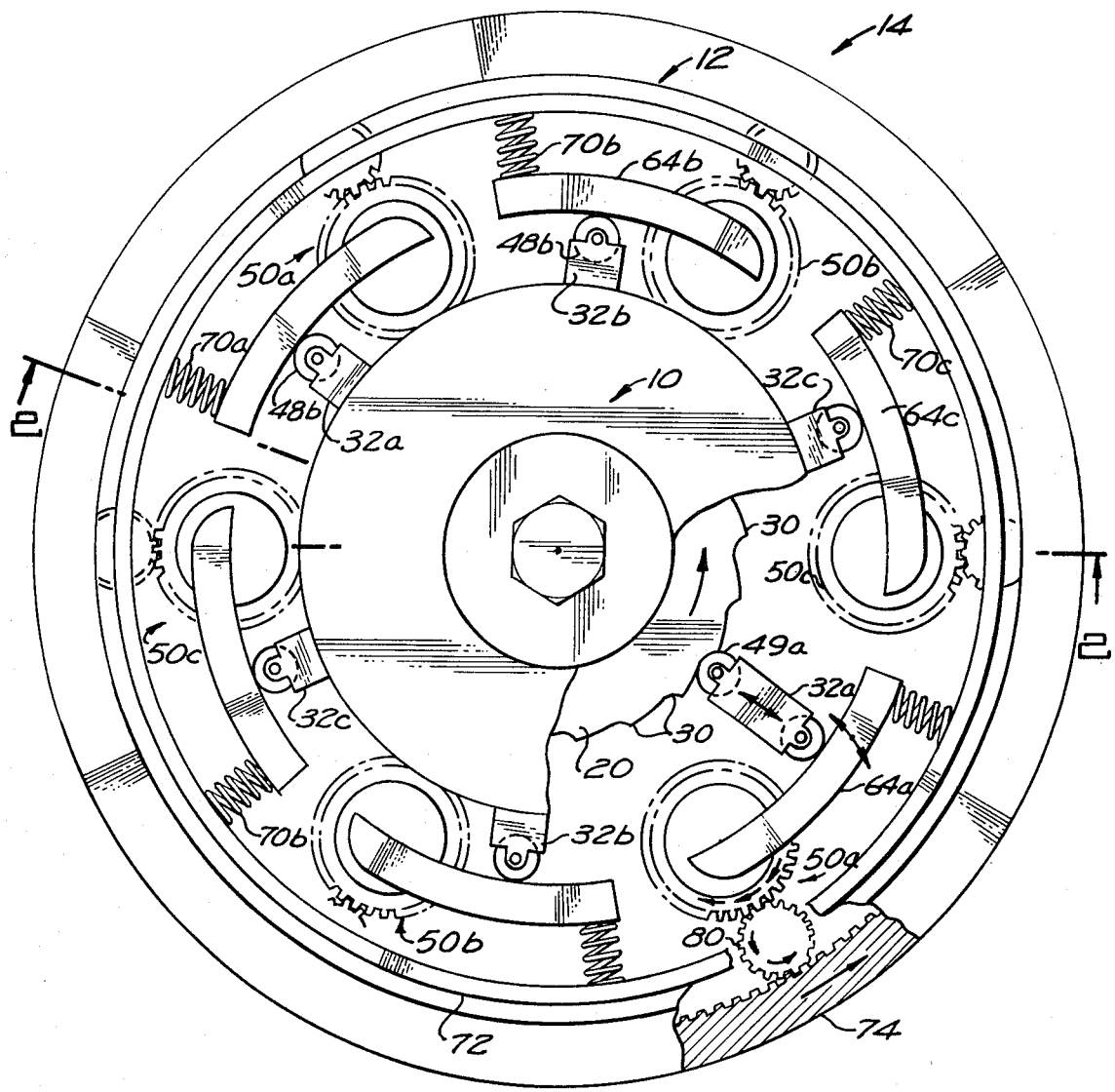
FIG. 1 is a plan view of a preferred embodiment of a drive mechanism formed in accordance with the invention (portions of the housing structure have been broken away to more clearly show the details of the drive)
Figure 2:
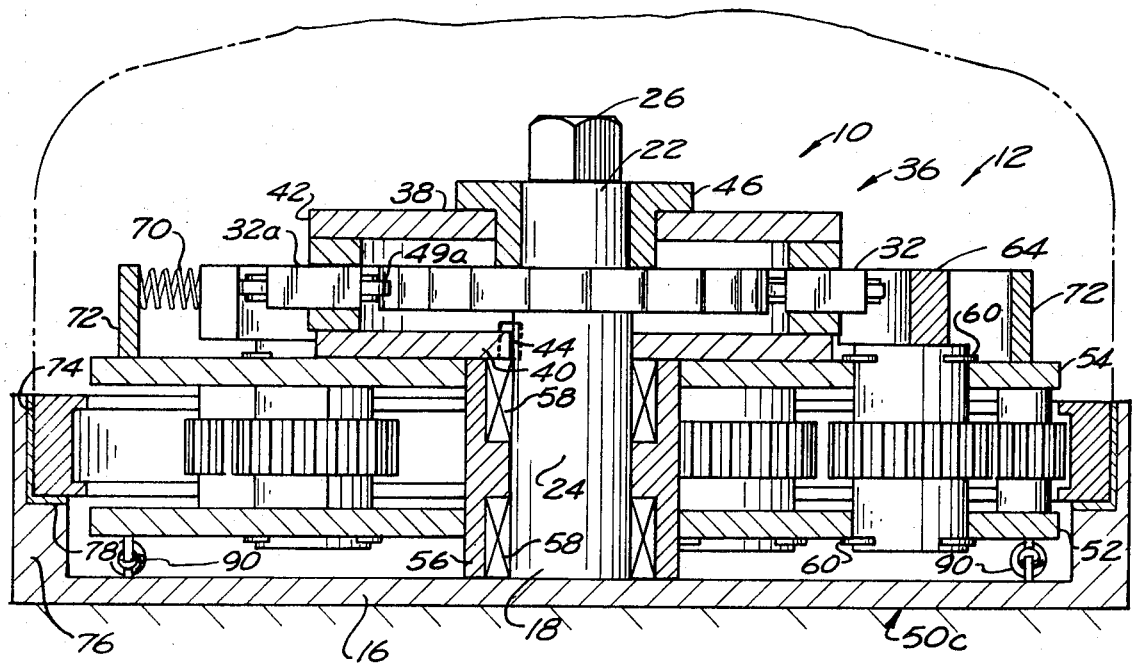
FIG. 2 is a cross-sectional view taken on line 2—2 of FIG. 1.

Referring more particularly to FIG. 1, the overall drive mechanism is shown as including a rotary cam input section 10 which operates through an intermediate drive or actuating section 12 to rotate a rotary output section 14. As best shown in FIG. 2, the entire drive assembly is mounted from a base member 16 which can be affixed to any particular support structure desired. Although the drive assembly is shown mounted horizontally, it should be appreciated that it can be mounted in any orientation desired.

Extending vertically upward from the base plate 16 is a stub shaft 18. Shaft 18 is, in the embodiment under consideration, welded or otherwise positively connected to the base plate 16 and supports the various rotatable portions of the assembly. Carried from the upper end of stub shaft 18 is the rotatable input cam section 10. The cam section 10 includes a cam member 20 which is rotatably mounted from the stub shaft 18. Although shown as comprising a single cam member, the cam section could include a stacked series of cam members if desired.

In the embodiment under consideration, a stepped diameter drive shaft 22 is keyed or otherwise positively connected to the cam 20 and has a larger diameter end portion 24 which is rotatably received on the stub shaft 18. The upper end of shaft 22 is adapted to be driven from any desired source of rotary motion. In the embodiment shown, the drive is particularly intended for use in a manually operated winch and the upper end of shaft 22 has a hex configuration as shown at 26 to receive a manual crank or the like.

Referring again to FIG. 1, it will be noted that the cam 20 is provided about its outer circumference with a plurality of lobes 30. As will hereafter become apparent, the shape and number of the lobes 30 can vary substantially from that shown. The lobes 30 are designed so that during rotation of the cam 20, reciprocatory movement in a generally radial direction is imparted to a plurality of cam follower members 32. As will be discussed more fully hereafter, the number and arrangement of the cam followers can vary from that shown. Also, the number and shape of the cam lobes can be varied. However, the subject embodiment provides six cam followers which are preferably arranged in diametrically opposed pairs relative to the cam member 20. The location of the cam followers relative to the cam is preferably such that at any point of rotation, at least one pair is moving in a radial outward direction simultaneously. For example, the opposed pair 32A are shown at the bottom or inward limit of movement. At this time, it would be preferable to, for example, have the opposed pair 32B both moving radially outward and approximately half way up the inclined surfaces of the lobes 30. Similarly, pair 32C should be approximately at the upper limit of movement at the apex of the lobes. By arranging the cam followers in opposed pairs, the lateral forces acting against the cam and its supports are counterbalanced and equal. This tends to prevent undue wear and reduce the support structure required for the cam means.

As best shown in FIG. 2, the cam follower members 32 constrained against all movement except reciprocation in a direction generally radially of the axis of rotation. Many types of structures could be used for providing the necessary guiding. In the embodiment shown, the follower members are carried in a guide housing 36 which comprises a pair of spaced plates 38 and 40 joined about their outer periphery to a circular guide plate member 42. The guide housing 36 is non-rotatably connected to the stub shaft 18 in any convenient manner such as through the use of a key 44. A bearing or sleeve 46 is positioned within plate 38 and rotatably receives the upper end portion of shaft 22. Each of the cam followers 32 are received in separate openings in the circular guide plate 42 so that they are constrained against any lateral movement but are guided for free radial reciprocation.

Although it should be appreciated that the cam followers can have many configurations and be of many types, they are shown as rectangular blocks or bars provided at their opposite ends with small rollers 48 and 49. The inner rollers 49 are arranged to engage the outer surface of the cam member. The outer rollers 48 engage separate portions of the intermediate drive section 12.

The intermediate drive section 12 functions to convert the radial reciprocation of the cam followers 32 into intermittant rotary motion which is, in turn, converted to continuous rotary output motion of the output section 14. The intermediate drive section 12 includes a plurality of overrunning or one-way clutch units 50 which have been identified with the suffix letter corresponding to the suffix letter of their associated cam follower mechanism. As is well known, the one-way type clutch can be of many forms such as, for example, simple ratchet mechanisms or the standard ball units which will convert oscillated input into intermittent unidirectional rotary output. In the subject embodiment, the overrunning clutches 50 are standard commercially available units.

The clutches 50 are carried by a pair of spaced plates 52 and 54. Plates 52 and 54 are affixed to an internal sleeve or the like 56 which is rotatably carried on stub shaft 18 by suitable bearings 58. It should be noted that the outer section of each of the one-way clutches 50 are rotatably mounted in the plates 54 for rotation about a vertical axis. In the embodiment under consideration, the overrunning clutches 50 are supported between the plates 52, 54 by snap rings 60.

The reciprocatory movement of the cam followers 32 is transmitted to the inner section of each of the overrunning clutches by a separate shaft or lever arm 64. Note that each of the overrunning clutches 50 has a separate arcuately extending lever portion 64 identified by the letter corresponding to the overrunning clutch with which it is associated. Each of the levers 64 are connected to the input section of their respective overrunning clutch and extend in a generally circumferential direction relative to the vertical axis of cam rotation. As shown, the inner surface of each lever 64 is preferably formed as a portion of a cylinder having the vertical axis of rotation of the cam as its center. As can be appreciated, reciprocation of the cam followers 32 produces oscillation of the corresponding lever 64 and, this results in a unidirectional intermittant rotary output of each of the corresponding overrunning clutches 50. It should be noted that each of the levers 64 is maintained under a continual counter-clockwise bias into engagement with its respective cam follower by a spring 70 which engages the lever adjacent its outer free end. The compression springs 70 are compressed between the lever and an outer cylindrical flange or the like 72 which is joined to the top plate 54 and extends upwardly therefrom.

The intermittant rotary output motion of the individual overrunning clutches 50 is transmitted to a rotary output member in the form of a large ring gear 74 which extends about the assembly and is coaxial with the vertical center axis of cam rotation. As shown in FIG. 2, the ring gear 74 is rotatably supported by a vertically extending flange 76 carried from the base plate 16 and extending upwardly therefrom. The upper surface of the member 76 is provided with a wear plate or the like 78 which carries and constrains the ring gear 74.

As best shown in FIG. 1, each of the overrunning clutches 50 has a gear portion 78 carried on its outer rotatable output section and connected through a pinion 80 with the ring gear 74. Pinions 80 are rotatably supported between the spaced plates 52, 54.

As can be appreciated, rotation of the cam 20 in the direction shown in FIG. 1 produces radial reciprocation of the cam followers 32 and corresponding oscillation of the associated lever 64. This motion is, in turn, transmitted to intermittent rotary motion of the output gear 78 on each of the overrunning clutches 50. The resultant motion applied to the ring gear 74 is a relatively constant rotation in the direction of the arrow in FIG. 1. Because of the overlapping relationship of the movement of the cam followers, the resulting movement of the ring 74 is relatively smooth rotation. It should be appreciated, that by varying the number of the cam follower/overrunning clutch combinations, and their relationship to the lobes of the cam, the resulting motion can be extremely smooth.

Figure 3:
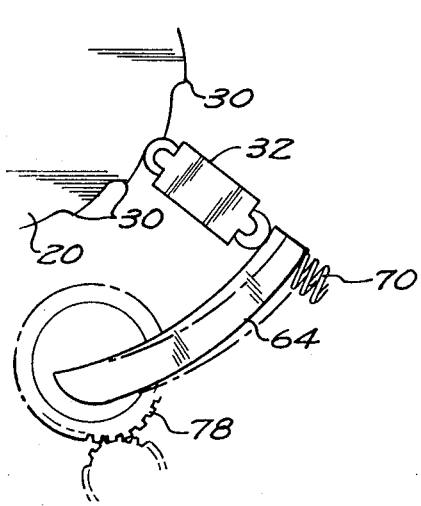
FIGS. 3 and 4 are partial plan views showing the drive mechanism under different load conditions.
Figure 4:
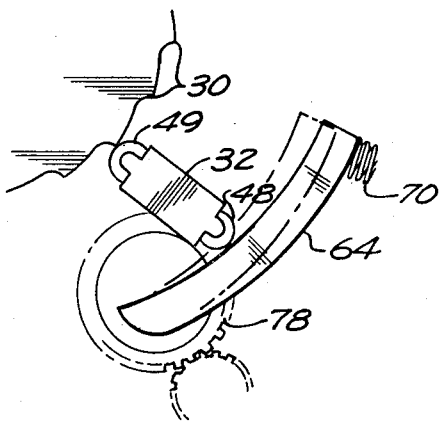

The arrangement thus far described gives a constant speed output with a constant speed input. However, in order that a constant speed input can be converted to a variable speed, variable torque output, the intermediate drive section 12 is arranged so that it can shift to vary the effective length of the lever arms 64. The shifting can be accomplished through automatic control means or by a simple biasing arrangement of the supports for the intermediate drive section. In the subject embodiment, the means shown for varying the output speed in response to the load encountered comprises coil springs 90 (see FIG. 1) connected between the base plate 16 and the support plate 52. The springs are located so that upon a load increase acting against the ring gear 74, the intermediate drive section 12 can shift slightly in an arcuate direction to shift the point of engagement of the cam followers along the lever arms 64. This is illustrated in FIGS. 3 and 4. In FIG. 3, the load acting against the output ring gear is relatively high and the intermediate drive section has rotated in a clockwise direction against the biasing springs 90 until the cam follower 32 is at the outermost end portion of the associated lever 64. This produces an increase in the mechanical advantage but, of course, a corresponding decrease in the amount of oscillation imparted to each lever 64. Accordingly, the output motion of each of the gears 78 is shorter and the resulting motion of the ring gear 74 is slower but of higher torque.

If the load on the ring gear decreases, the biasing springs 90 rotate the intermediate drive section in a counterclockwise direction until the forces are substantially balanced. FIG. 4 shows the cam follower 32 at an intermediate load position somewhere close to the midpoint of the lever arm 64. At this location, the mechanical advantage is less, but the lever arm is given a greater oscillation for the same movement of the cam follower. This, in turn, produces a larger impulse movement of the gear 78 and a more rapid resulting rotation of the outer ring gear 74.

As can be appreciated, by selecting the tension springs 90, the apparatus can produce a variable speed output with a constant torque input throughout a wide range of loads. It should be understood that the springs are thus selected to suit the needs of the particular range of output loads expected to be encountered. Also, it should be understood that various types of adjustable or automatic control means could be provided for shifting the intermediate drive section as required to match the output loads.

Because of the arrangement of the drive mechanism, the loads acting against the center shaft are balanced. Note that the opposed relationship of the cam followers assures that radial loads are always of equal and opposite magnitude. Similarly, because of the relationship of the cam followers and their overlapping movement produced by their positioning relative to the cam, the output motion is extremely smooth with substantially no backlash since, at all times, at least two of the overrunning clutches are driving the ring gear.

The invention has been described in great detail to enable one of ordinary skill in the art to make and use the same. Obviously, modifications and alterations of the preferred embodiment will occur upon a reading and understanding of the specification and it is our intention to include all such modifications and alterations as part of our invention insofar as they come within the scope of the appended claims.

What is claimed is:

1. A drive mechanism comprising:
    a. rotary cam means mounted for rotation about a first axis;
    b. a plurality of cam followers mounted about said cam means and guided for movement generally radially of said first axis, each of said cam followers being constrained relative to said cam means in a manner such that upon rotation of said cam means said followers undergo linear reciprocation generally radially of said first axis;
    c. separate lever means engaged by each of said cam followers and mounted so that upon reciprocation of said cam followers said lever means are oscillated;
    d. overrunning clutch means drivingly connected to each of said lever means; and,
    e. a rotary output member driven by said overrunning clutch means.

2. The drive mechanism as defined in claim 1 wherein said cam followers are positioned in pairs on diametrically opposite sides of said first axis.

3. The drive mechanism as defined in claim 1 wherein said cam means includes a plurality of lobes and wherein said cam followers are located so that during rotation of said cam means at least one of said followers is always moving radially outward of said axis.

4. The drive mechanism as defined in claim 1 wherein said lever means are mounted for adjusting movement so that the effective length of said lever means can be varied.

5. The drive mechanism as defined in claim 1 wherein said overrunning clutch means are mounted for rotation about independent axes parallel to said first axis.

6. A variable speed pulse drive mechanism comprising:
 a. a rotary cam means mounted for rotation about a first axis;
 b. a plurality of cam followers adapted to be reciprocated in first and second directions radially of said first axis upon rotation of said cam means;
 c. a plurality of lever means positioned about said first axis and each drivingly engaged with a separate one of said cam followers so that reciprocation of said cam followers produces oscillation of said lever means;
 d. separate overrunning clutch means drivingly connected to each of said lever means, said clutch means each including a portion which is given intermittent unidirectional rotary movement upon oscillation of said lever means; and,
 e. adjustable means supporting said lever means for permitting their effective length to be varied.

7. The drive mechanism as defined in claim 6 wherein said adjustable means carry said overrunning clutch means.

8. The drive mechanism as defined in claim 6 wherein each of said overrunning clutch means is drivingly engaged with a rotary output member.

9. The drive mechanism as defined in claim 6 wherein said cam followers are positioned in opposed pairs on diametri-cally opposite sides of said cam means.

10. The drive mechanism as defined in claim 6 wherein said cam means and said cam followers are arranged so that there is always at least one of said followers moving in said first direction.

11. The drive mechanism as defined in claim 6 wherein said adjustable means comprises a support frame mounted for limited rotation about said first axis.

12. The drive mechanism as defined in claim 11 wherein said support frame is maintained under a bias tending to rotate it about said first axis.

13. A winch mechanism comprising:
 a. a winding drum mounted for rotation about a first axis;
 b. a cam means adapted to be rotated about said first axis;
 c. a plurality of cam followers positioned for engagement with said cam means and constrained to reciprocate radially of said first axis;
 d. separate lever means engaged by each of said follower means and mounted for oscillation in response to reciprocation of said follower means;
 e. separate overrunning clutch means drivingly connected to each of said lever means and each including a driven portion which undergoes unidirectional intermittent rotation in response to oscillation of the lever means; and,
 f. gear means interconnecting said driven portions and said winding drum.

* * * * *